(12) United States Patent
Benevelli et al.

(10) Patent No.: US 11,667,172 B2
(45) Date of Patent: Jun. 6, 2023

(54) SUSPENSION SYSTEM AND METHOD FOR OPERATION OF SAID SYSTEM

(71) Applicant: Dana Motion Systems Italia S.R.L., Reggio Emilia (IT)

(72) Inventors: Alessandro Benevelli, Reggio Emilia (IT); Stefano Fasano, Reggio Emilia (IT); Nicola Francesco Musciagna, San Giovanni in Persiceto (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 221 days.

(21) Appl. No.: 16/943,388

(22) Filed: Jul. 30, 2020

(65) Prior Publication Data

US 2022/0032714 A1 Feb. 3, 2022

(51) Int. Cl.
   *B60G 17/048* (2006.01)
   *B60G 17/056* (2006.01)
   *B60G 21/00* (2006.01)

(52) U.S. Cl.
   CPC ......... *B60G 17/048* (2013.01); *B60G 17/056* (2013.01); *B60G 21/00* (2013.01); *B60G 2202/15* (2013.01); *B60G 2202/42* (2013.01); *B60G 2204/40* (2013.01)

(58) Field of Classification Search
   CPC .... B60G 17/048; B60G 17/056; B60G 21/00; B60G 2202/15; B60G 2202/42; B60G 2240/40; B60G 17/0565
   See application file for complete search history.

(56) References Cited

U.S. PATENT DOCUMENTS

| 3,970,327 A | 7/1976 | Dezelan |
| 5,338,010 A | 8/1994 | Haupt |
| 5,519,611 A * | 5/1996 | Tagawa ................ B60G 17/018 701/37 |

(Continued)

FOREIGN PATENT DOCUMENTS

| DE | 4242448 C1 | 3/1994 | |
| DE | 10047631 A1 * | 4/2002 | ................ B66F 9/22 |
| DE | 102004040758 A1 * | 7/2005 | ........... B60G 17/056 |

OTHER PUBLICATIONS

Machine Translation of DE10047631 (Year: 2002).*

*Primary Examiner* — Paul N Dickson
*Assistant Examiner* — Kurtis Nielson
(74) *Attorney, Agent, or Firm* — McCoy Russell LLP (57) ABSTRACT

Methods and systems for vehicle suspension are provided. A leveling manifold includes, in one example, a plurality of electrically-activated valves arranged between, on a first end, a rod-side and a piston-side of one or more hydraulic cylinders, and on a second end, a pressure source and a tank, wherein the plurality of electrically-activated valves include a first valve, a second valve, a third valve, and a fourth valve. The leveling manifold further includes a first flow path extending through the first and second valves and from the rod-side to the second end and a second flow path extending through the third and fourth valves and from the piston-side to the second end, the leveling manifold is designed to manage operation of the first, second, third, and/or fourth valves to independently adjust a position and a stiffness of the one or more hydraulic cylinders.

18 Claims, 6 Drawing Sheets

(56) References Cited

U.S. PATENT DOCUMENTS

| | | | | |
|---|---|---|---|---|
| 6,145,859 A * | 11/2000 | Altherr | ................ | B60G 9/003 |
| | | | | 280/124.159 |
| 6,578,855 B2 | 6/2003 | Wallestad | | |
| 7,048,280 B2 | 5/2006 | Brandenburger | | |
| 7,059,127 B2 | 6/2006 | Bauer et al. | | |
| 8,291,925 B2 * | 10/2012 | Gehlhoff | ............... | F15B 20/002 |
| | | | | 137/596.17 |
| 9,505,288 B2 * | 11/2016 | Bauer | ....................... | F16F 9/50 |
| 2005/0067239 A1 * | 3/2005 | Bauer | .................... | B60G 21/06 |
| | | | | 188/297 |
| 2007/0278752 A1 * | 12/2007 | Schedgick | ......... | B60G 17/0416 |
| | | | | 280/5.514 |
| 2010/0044976 A1 * | 2/2010 | Rades | .................. | B60G 21/106 |
| | | | | 280/5.507 |
| 2014/0116243 A1 * | 5/2014 | Six | ....................... | B60G 17/056 |
| | | | | 91/418 |
| 2015/0001825 A1 * | 1/2015 | Kazimiers | ............ | B60G 21/073 |
| | | | | 280/124.112 |
| 2018/0037083 A1 * | 2/2018 | Seminara | ........... | B60G 17/0408 |

* cited by examiner

| | | First Valve (200) | Second Valve (202) | Third Valve (204) | Fourth Valve (206) |
|---|---|---|---|---|---|
| Position Control Mode | 402 Increase position while sustaining stiffness | Off | On (Pressure control) | On (Position control) | Off |
| | 404 Decrease position while sustaining stiffness | On (Pressure control) | Off | Off | On (Position control) |
| Position & Pressure Control Mode | 406 Increase position and stiffness | On (Pressure control) | Off | On (Position control) | Off |
| | 408 Decrease position and stiffness | Off | On (Pressure control) | Off | On (Position control) |
| | 410 Increase position and decrease stiffness | Off | On (Pressure control) | On (Position control) | Off |
| | 412 Decrease position and increase stiffness | On (Pressure control) | Off | Off | On (Position control) |
| Pressure Control Mode | 414 Increase stiffness while sustaining position | On (Pressure control) | Off | On (Pressure control) | Off |
| | 416 Decrease stiffness while sustaining position | Off | On (Pressure control) | Off | On (Pressure control) |

SUSPENSION SYSTEM AND METHOD FOR OPERATION OF SAID SYSTEM

TECHNICAL FIELD

The present disclosure generally relates to a suspension system with a leveling manifold and a method for operation of the suspension system and leveling manifold.

BACKGROUND AND SUMMARY

Some vehicles utilize adjustable suspension systems to alter vehicle handling. Certain suspension systems vary suspension kinematics using spring stiffness control. For example, previous suspension systems have attempted to provide active spring adjustment. Suspension stiffness adjustment may be particularly desirable in vehicles with a wide operating speed range, such as agricultural vehicles designed for off and on road operation. Suspension height adjustment may be deployed in some systems to alter the distance between a vehicle axle and chassis.

U.S. Pat. No. 7,059,127 B2 to Bauer discloses a hydro-pneumatic spring support arrangement in an agricultural machine. Bauer's spring support arrangement changes the device's spring rate during ballast adjustments to conform the spring rate to dynamic vehicle ballasting conditions.

The inventors have recognized several drawbacks with Bauer's hydro-pneumatic suspension system and other vehicle suspension systems. Bauer's system requires the suspension's spring rate and ballast to be varied in unison. Other vehicle suspension systems have correspondingly employed interdependent stiffness and position adjustment. These systems exhibit relatively low degrees of freedom in relation to the system's kinematic adjustability. The inventors have recognized that it may be desirable to increase the degrees of freedom of a suspension system in relation to kinematic adjustability.

To overcome at least some of the aforementioned challenges, a leveling manifold is provided. The leveling manifold includes, in one example, a plurality of electrically-activated valves arranged between, on a first end, a rod-side and a piston-side of one or more hydraulic cylinders. On a second end, the valves are arranged between a pressure source and a tank. The plurality of electrically-activated valves includes a first valve, a second valve, a third valve, and a fourth valve. The leveling manifold further includes a first flow path extending through the first and second valves and from the rod-side to the second end. The leveling manifold further includes a second flow path extending through the third and fourth valves and from the piston-side to the second end. The leveling manifold is designed to manage operation of the first, second, third, and/or fourth valves to independently adjust a position and a stiffness of the one or more hydraulic cylinders. In this way, a modular vehicle suspension package is provided for the independent management of suspension position and stiffness, if so desired. Suspension system functionality is expanded and suspension system performance may be increased as a result of the decoupled position and stiffness modes of adjustment.

In another example, the leveling manifold may further comprise a controller configured to adjust the position of the one or more hydraulic cylinders independent of adjusting a stiffness of the one or more hydraulic cylinders, in a position control mode. In this way, suspension stiffness and position may each be granularly tuned, at separate intervals, to achieve desirable suspension system performance that may be tailored to operating conditions. For instance, suspension stiffness may be increased, responsive to an increase in vehicle speed, when vehicle speed surpasses a threshold value, etc., to increase handling performance while the vehicle travels at higher speeds.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A vehicle suspension system with a leveling manifold is described herein. The leveling manifold may independently manage position and stiffness operation, in certain operating modes, if wanted. For instance, while operating in a pressure control mode, the leveling manifold may modulate suspension stiffness based on operating conditions such as vehicle speed. Conversely, while operating in a position control mode, the leveling manifold may alter suspension height taking into account operating conditions such as vehicle load (e.g., weight distribution). Thus, the system may realize independent implementation of the pressure and position control modes, thereby expanding the degrees of freedom of suspension adjustment. The suspension platform's performance may increase as a result of the increase in the suspension system's modal capabilities, if desired. For instance, in one mode, the suspension's stiffness may be adjusted taking into account in vehicle speed to increase vehicle handling performance. In an alternate mode, the suspension's height may be adjusted to accommodate for variations in vehicle weight distribution.

Figure 1:
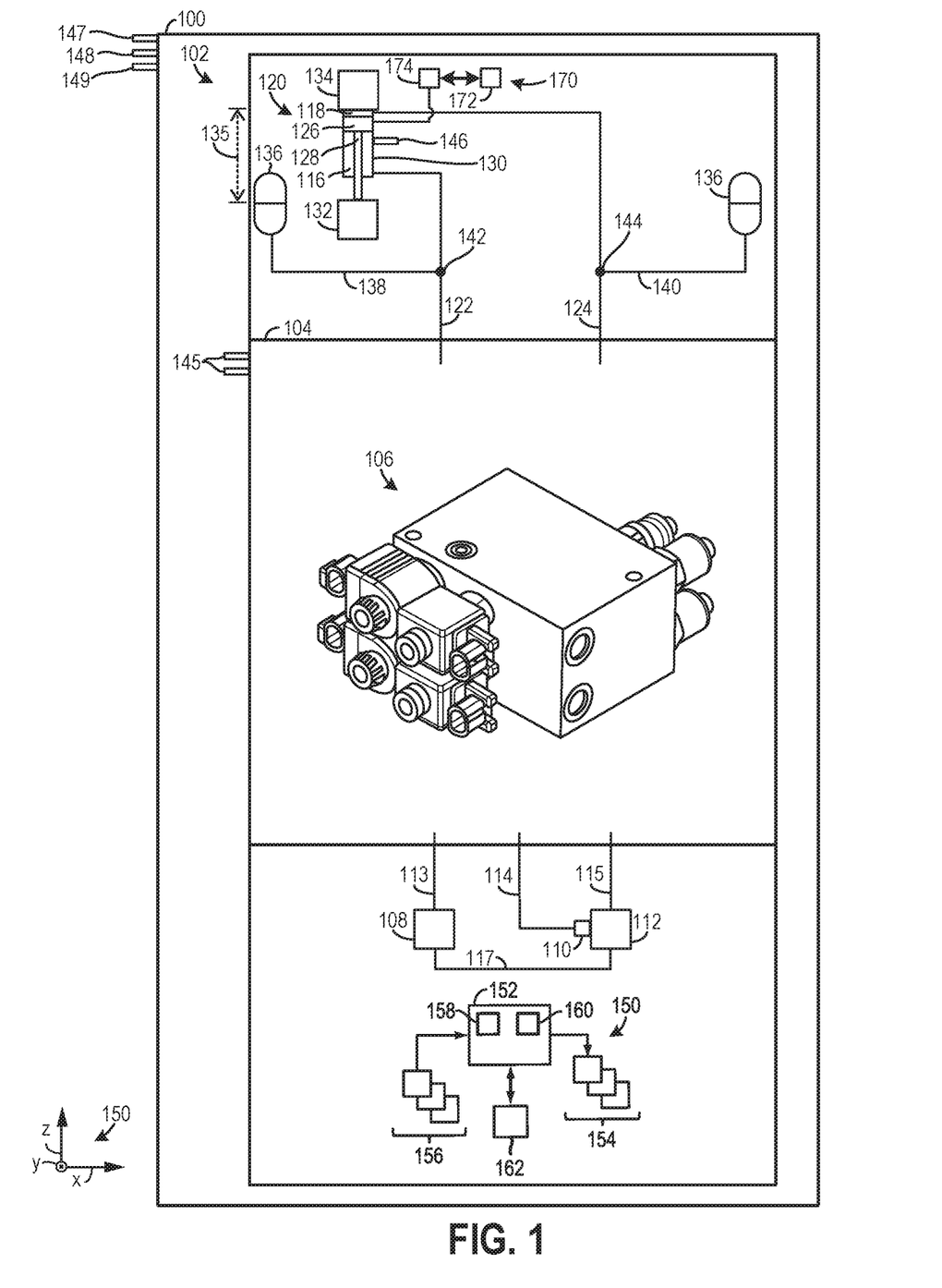
FIG. 1 shows a schematic representation of a vehicle including a suspension system.
Figure 2:
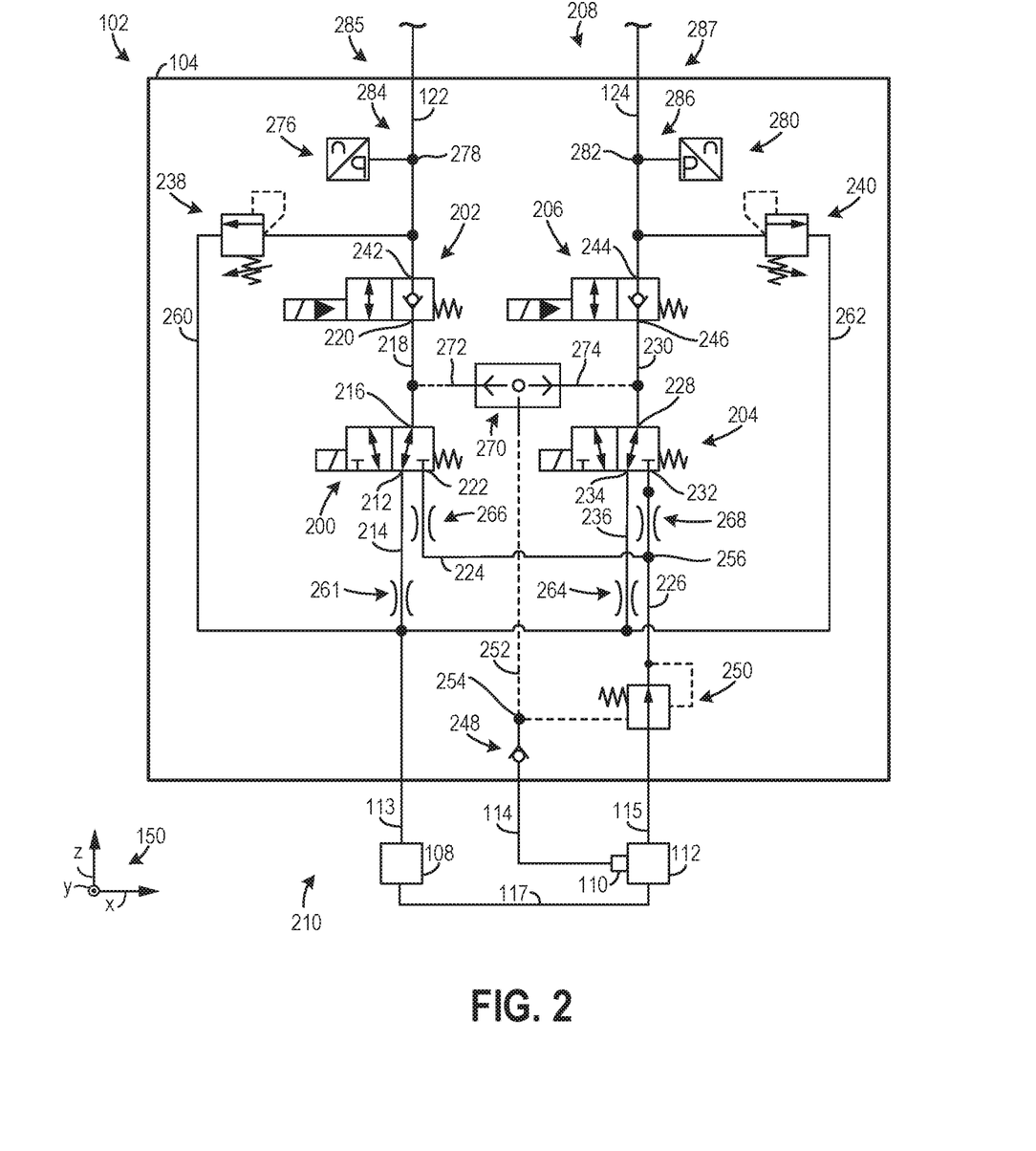
FIG. 2 shows a detailed illustration of a first embodiment of a leveling manifold included in the suspension system, depicted in FIG. 1.
Figure 3:
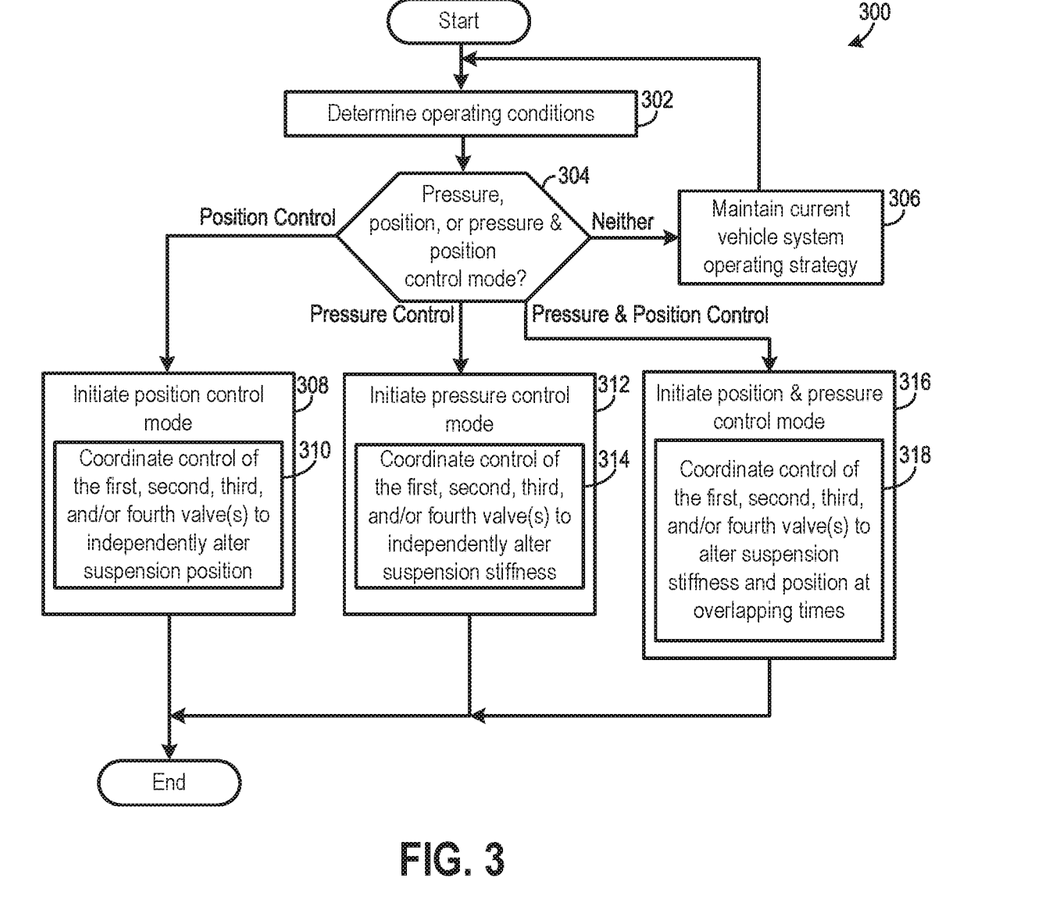
FIG. 3 shows a method for operation of a leveling manifold in a suspension system.
Figure 4:
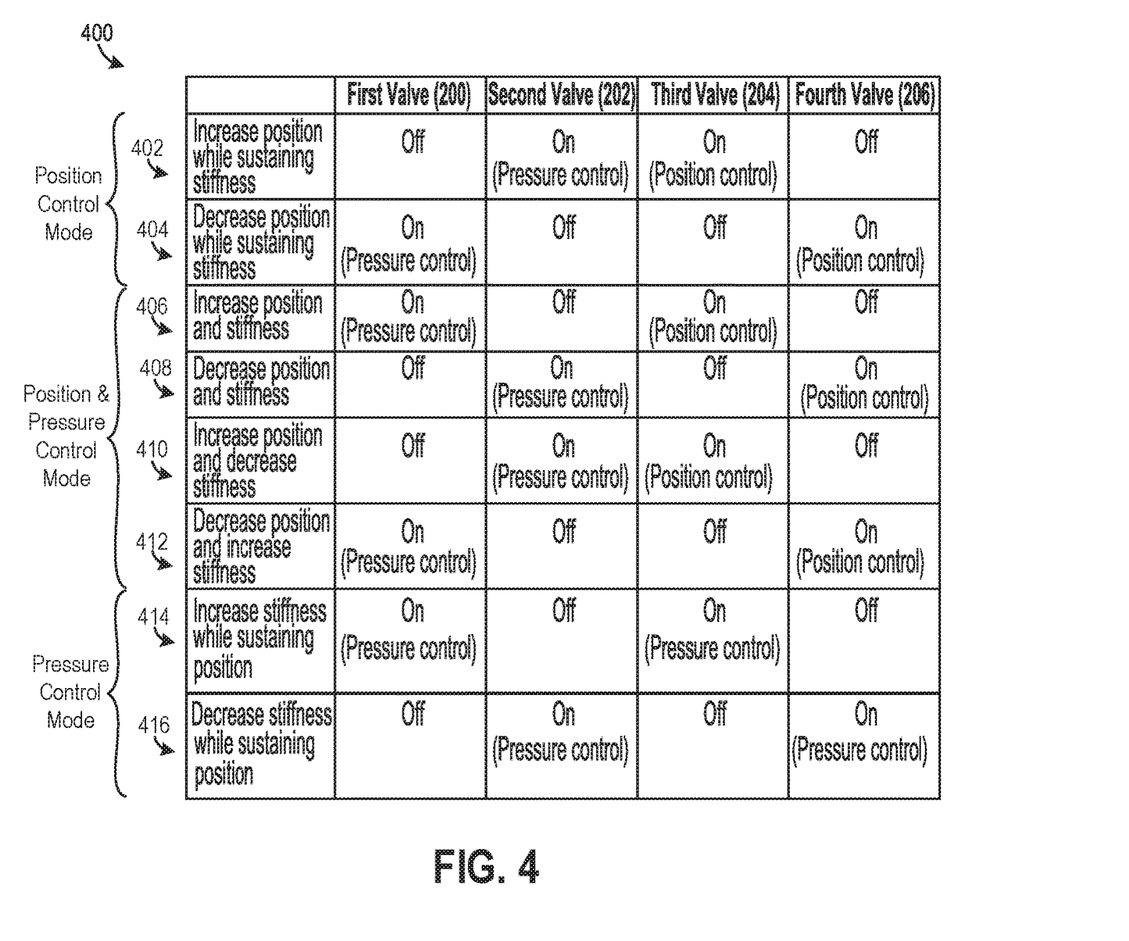
FIG. 4 shows a table indicating use-case operating modes of the leveling manifold, depicted in FIG. 2.
Figure 5:
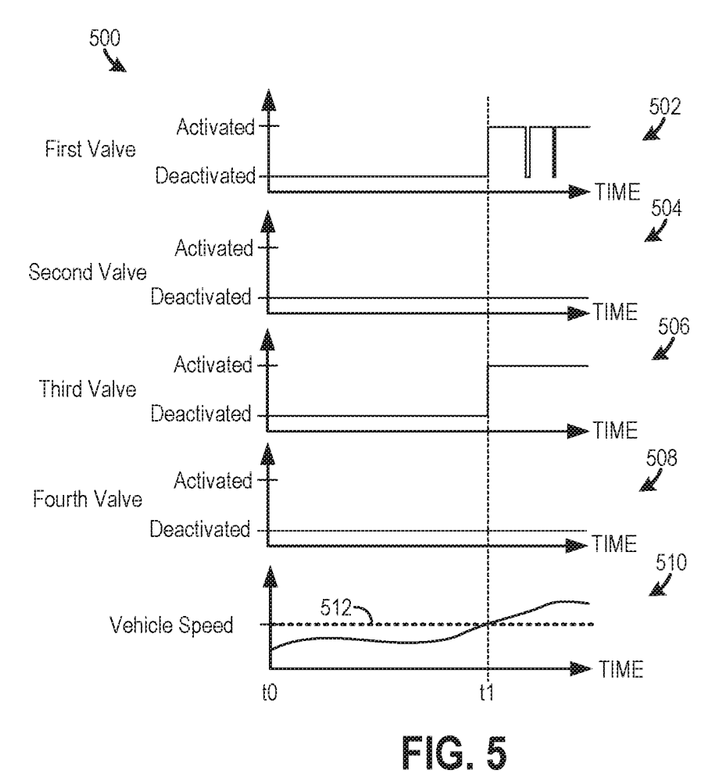
FIG. 5 shows a timing diagram of a use-case leveling manifold control strategy.
Figure 6:
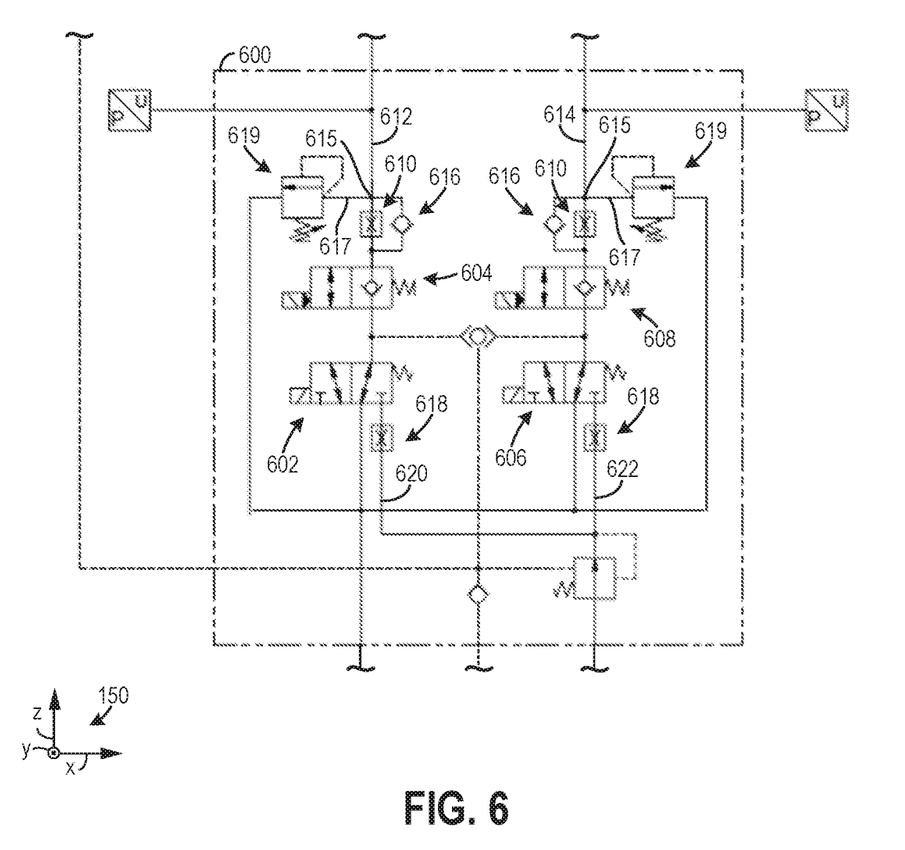
FIG. 6 shows a second embodiment of a leveling manifold.

FIG. 1 depicts a suspension system in a vehicle with a leveling manifold configured to independently adjust suspension position and stiffness. FIG. 2 depicts a detailed representation of a first embodiment of the leveling manifold and corresponding hydraulic circuity with valving which allows for independent position and stiffness adjustment. FIG. 3 shows a method for operation of the suspension system in a pressure control mode, a piston control mode, and a piston and pressure control mode. FIG. 4 depicts a chart delineating the wide variety of suspension adjustment modalities that may be available in the suspension system. FIG. 5 illustrates a timing diagram corresponding to a use-case suspension stiffness control strategy. FIG. 6 shows a second embodiment of a leveling manifold designed with independent position and stiffness adjustment functionality.

FIG. 1 illustrates a higher-level depiction of a vehicle 100 with a suspension system 102. The vehicle 100 may, in one example, be an agricultural or industrial vehicle. In other examples, the vehicle may be a light, medium, or heavy duty commercial vehicle, passenger vehicle, and the like. Agricultural and industrial vehicles may, in certain instances, experience wider variances in load and/or speed during use and therefore may be particularly suited to leverage performance gains from the suspension system's kinematic adjustability described herein. However, other vehicles may similarly exhibit suspension performance gains and the suspension system therefore may have applicability across a wide variety of vehicle platforms to achieve targeted kinematic characteristics.

The suspension system 102 may be designed with modular component groups to facilitate an expansion of the suspension system's functionality and adaptability. Consequently, the suspension platform may be deployed in an even wider array of vehicles, which may further increase the platform's customer appeal.

The suspension system 102 includes a leveling manifold 104. The leveling manifold 104 embodied in FIG. 1 has a specific form factor 106 with a housing and input-output ports. However, the leveling manifold may be formed with a variety of suitable housing and input-output ports profiles, arrangements, etc. The leveling manifold may specifically have a modular design, as previously mentioned, which allows the manifold to be efficiently integrated into suspension systems with other modules aimed at meeting the vehicle's end-use design goals. For example, the system's kinematic adjustability may be tailored to achieve design goals of a wide array of vehicle platforms, if so desired. The features of the fluidic circuitry of the leveling manifold 104 are expanded upon herein with regard to FIG. 2.

The leveling manifold 104 may couple to a tank 108, a load sensing (LS) component 110 (e.g., compensator), and/or a pump 112 or other suitable pressure source. As described herein, the coupling between hydraulic lines, components, etc. may denote fluidic coupling between the components where fluidic communication is established. A tank line 113 may extend between the tank 108 and the leveling manifold 104 and provide fluidic connection therebetween. As described herein, a line may a hydraulic conduit which encloses a hydraulic fluid and provides fluidic coupling between components to which it is attached. A load sensing line 114 may extend between the LS component 110 and the leveling manifold 104 and a pump line 115 may extend between the pump 112 and the leveling manifold. It will be appreciated that additional components may be positioned between the tank, LS component, and/or the pump and the leveling manifold, in other embodiments.

The tank 108 may function as a reservoir for the system's working fluid. The system's working fluid be a suitable hydraulic fluid such as oil (e.g., natural and/or synthetic oil). Thus, the tank 108 may include a housing which encloses the system's working fluid. The tank 108 may be fluidically coupled to the pump 112 via line 117. The pump 112 may be designed to deliver pressurized fluid to the leveling manifold 104. For instance, the pump may be a variable displacement pump (e.g., axial piston pump) with a load sensing control device (e.g., compensator). However, other suitable types of pumps such as axial-flow pumps, centrifugal pumps, a pump with a pressure vessel, etc. may be used in the system, in other embodiments. The LS component 110 is shown coupled to the pump 112. Thus, the LS component 110 and the pump 112 may work in conjunction to adjust pump output based on the load sensing pressure. For instance, the LS component (e.g., pressure compensator) may constrain a higher operating pressure (e.g., an upper operating pressure) by reducing pump displacement (e.g., reducing pump displacement to a lower value such as substantially zero) when the threshold pressure is reached. The LS component may therefore function as a pump control device.

The leveling manifold 104 may couple to a rod-side 116 and a piston-side 118 of a hydraulic cylinder 120 via fluid lines 122, 124, respectively. The rod-side 116 of the cylinder may be a rod chamber and the piston-side may be piston chamber. Thus, the lines include ports opening into the rod-side and the piston-side of the hydraulic cylinder. The hydraulic cylinder 120 may therefore take the form of a double acting hydraulic cylinder which allows the system's ride height and stiffness adjustment features to be carried out. The hydraulic cylinder may include components such as a piston 126, a piston rod 128, a cylinder barrel 130, seals, etc. which allow the suspension's height and/or stiffness to be varied. The hydraulic cylinder 120 may mechanically couple to a first vehicle component 132 (e.g., a vehicle axle) and a second vehicle component 134 (e.g., a vehicle chassis). The vehicle axle may, in one embodiment, be a steerable axle, such as a front axle. In this way, the adjustments of the suspension system may affect vehicle steering characteristics. However, in other examples, the hydraulic cylinder 120 may mechanically couple to a rear axle. The relative position between the first and second vehicle components may be referred to as the suspension's position (e.g., ride height). A distance between the first vehicle component 132 and the second vehicle component 134, dictated by the hydraulic cylinder 120, is indicated at 135. In a position adjustment mode, this distance may be lengthened or shortened to vary ride height. For instance, the cylinder's height may be adjusted taking into account vehicle load (e.g., weight distribution). The variation in the system's ride height may bolster various aspects of vehicle operation such as handling, material loading/unloading operation, and the like.

FIG. 1 depicts fluid lines 122, 124 extending from the leveling manifold to the hydraulic cylinder 120. Nevertheless, additional or alternative hydraulic cylinders may be in fluidic communication with the leveling manifold 104. For instance, a second hydraulic cylinder may additionally be in fluidic communication with the fluid lines 122, 124. In such an example, the hydraulic cylinders may be arranged on opposing lateral sides (e.g., driver and passenger sides) of the vehicle. Further, in alternate implementations, additional modular suspension components may be arranged between the leveling manifold and the hydraulic cylinder, such as a modular blocks providing dampening functionality, roll motion adjustment, and the like.

The suspension system 102 may include accumulators 136. The accumulators 136 may couple to the lines 138, 140 which extends between the leveling manifold and the piston-side 118 and rod-side 116 of the hydraulic cylinder 120. The accumulators 136 may enable the system to cope with swings in fluid demand. Specifically, in some examples, the lines 138, 140 may extend from the accumulators 136 to junctions 142, 144 with the lines 122, 124, respectively.

The vehicle 100 may further include a control system 150 with a controller 152, actuators 154, and sensors 156. The controller 152 may include one or more physical devices. The physical devices may be spaced apart and/or collocated, in some embodiments. Actuators 154 may be disposed in the system's controllable components such as valves. To elaborate, the controller 152 may receive signals from the sensors 156 positioned in various locations in the suspension system 102. The sensors may include pressure sensors 145 coupled to lines in the leveling manifold 104, a position sensor 146 coupled to the hydraulic cylinder 120, a temperature sensor 147, a vehicle speed sensor 148, a vehicle load sensor 149, and the like.

The controller 152 may additionally send control signals to the actuators 154 positioned at different locations in the suspension system 102 and vehicle 100. For instance, the controller 152 may send signals to actuators in the leveling manifold 104 such as actuators of valves (e.g., valves 200, 202, 204, 206 shown in FIG. 2), actuators of the LS component 110, and the like to transition the system into different operating modes (e.g., a position adjustment mode, a pressure adjustment mode, and/or a joint position and pressure adjustment mode). For example, the controller 152 may send a control signal to an actuator in a valve to turn the valve on or off. Thus, the other controllable components in the suspension system may similarly function with regard to command signals and actuator adjustment.

The controller 152 may include suitable circuitry for carrying out the sensing and control functionality such as memory 158 and a processor 160, in one example. In such an example, of the controller 152 may hold instructions stored therein that, when executed by the processor 160, cause the controller to perform the various methods, control techniques, etc., described herein. The processor 160 may include a microprocessor unit and/or other types of circuits. The memory 158 may include known data storage mediums such as random access memory, read only memory, keep alive memory, combinations thereof, etc. However, the controller may include additional or alternate circuitry for carrying out the sensing and control strategies described herein.

The controller 152 may couple to an input device 162 (e.g., a console instrument panel, a touch interface, a touch panel, a keyboard, combinations thereof, etc.). The input device 162, responsive to driver input, may generate a request to adjust suspension stiffness and/or position. However, in other examples, the stiffness and/or position may be automatically adjusted based on vehicle operating conditions.

The suspension system 102 may operate in different modalities which enable the hydraulic cylinder's position and stiffness to be independently adjusted. To elaborate, the leveling manifold 104 may, in a position adjustment mode, deliver fluid to the cylinder's piston chamber to extend the suspension (e.g., increase the height of the chassis (e.g., front chassis) while substantially maintaining a pre-set target pressure in the rod chamber (slightly discharging rod chamber). Additionally, the leveling manifold may, in the position adjustment mode, discharge fluid from the hydraulic cylinder's piston chamber in order to retract the suspension itself (e.g., lowering-down the vehicle chassis), while substantially maintaining a pre-set target pressure in the rod chamber (e.g., slightly pressurizing rod chamber). In a pressure adjustment mode, the leveling manifold may pressurize both of the cylinder's piston and rod chambers to increase suspension stiffness without substantially changing axle position, if wanted. Further, in the pressure adjustment mode, the leveling manifold may discharge both the cylinder's piston and rod chambers in order to reduce suspension stiffness without substantially changing axle position. In this way, the operational functionality of the suspension system is expanded which enables the suspension system's degrees of freedom to be correspondingly increased. The system's ride height and suspension stiffness may therefore be granularly adjusted at separate times to more aptly suit at least some of the operating conditions experienced by the vehicle, if so desired.

The suspension system 102 may include a regenerative assembly 170 which may comprise an energy storage device 172 which may receive electrical energy from a device 174 configured to convert the hydraulic cylinder's kinetic energy into electrical energy. For instance, energy may be collected from hydraulic cylinder 120 during selected periods while the cylinder compresses. The device 174 may be coupled and/or at least partially integrated into the cylinder. For example, the device 174 may comprise a generator rotationally coupled to a hydraulic motor which is driven via fluid flow from the cylinder, in one embodiment. Regenerative suspension operation is discussed in greater detail herein.

An axis system 190 is provided in FIG. 1 as well as FIGS. 2 and 6, for reference. The z-axis may be a vertical axis, the x-axis may be a lateral axis, and/or the y-axis may be a longitudinal axis, in one example. However, the axes may have other orientations, in other examples.

FIG. 2 illustrates a detailed depiction of the leveling manifold 104 in the suspension system 102. A plurality of electrically-activated valves is included in the leveling manifold 104. The valves may include a first valve 200, a second valve 202, a third valve 204, and/or a fourth valve 206. The lines 122, 124 extending between the leveling manifold 104 and the piston-side and rod-side of the hydraulic cylinder are again illustrated. The lines 113, 114, 115 extending between the tank 108, LS component 110, and pump 112, respectively, are again depicted. The line 117 extending between the tank 108 and the pump 112 is again illustrated.

The valves 200, 202, 204, 206 are therefore arranged between the piston and rod sides 118, 116 of the hydraulic cylinder 120, shown in FIG. 2, on a first end 208. The valves 200, 202, 204, 206 are further arranged on a second end 210 between the tank 108 and pump 112 on a second end 210. In this way, the valves may be efficiently packaged in the leveling block of the hydraulic circuit. The aforementioned valve arrangement may further allow the hydraulic circuit to achieve the independent position and stiffness adjustment functionality expanded upon in greater detail herein.

The first valve 200 may be a 3-way/2-position (3/2) valve with three hydraulic ports and two positions. Thus, the first valve 200 may include a port 212 coupled to a line 214 in fluidic communication with the tank 108. The first valve may further include a port 216 coupled to a line 218 in fluidic communication with a port 220 of the second valve 202. The first valve may further include a port 222 coupled to a line 224 which extends between the first valve and a line 226 in fluidic communication with the third valve 204 and pump 112. In the valve's "off" position, fluid flow between the ports 212, 216 may be permitted and fluid flow from the port 222 may be inhibited. Conversely, in the valve's "on" position, fluid flow between ports 222, 216 may be permitted and fluid flow through the port 212 may be blocked. It will be appreciated that the "on" position of the first valve and the other valves described herein may correspond to the valve's energized state and the "off" position may correspond to the valve's de-energized state. Furthermore, junctions, denoted via circular dots, are depicted at the interfaces between the fluid lines in the circuits. These junctions serve as connections between the fluid lines.

The third valve 204 may similarly be a 3/2 type valve. Thus, the third valve 204 may include a port 228 coupled to a line 230 in fluidic communication with the fourth valve 206. The third valve 204 may further include a port 232 coupled to the line 226 in fluidic communication with the pump 112. The third valve may further include a port 234 coupled to a line 236 in fluidic communication with a first relief valve 238 (e.g., pressure reducing valve) and a second relief valve 240 as well as the tank 108. In the "off" position, the third valve 204 permits fluid flow between the ports 234, 228 and blocks fluid flow from the port 232. Conversely, in the "on" position, the third valve 204 permits fluid flow between ports 232, 228 and blocks fluid flow through the port 234.

The second valve 202 may be a 2/2 valve with two ports and two flow positions. Thus, the second valve 202 may include a port 242 coupled to the line 122 in fluidic communication with the rod-side 116 of the hydraulic cylinder 120, shown in FIG. 1. The second valve 202 may further include the port 220 coupled to the line 218. While arranged in an "off" position, the second valve 202 may include a one-way device (e.g., check valve) arranged between the ports 220, 242. Thus, in the "off" position, the second valve 202 permits fluid flow from the port 220 to the port 242 and inhibits fluid flow in the opposite direction from port 242 to port 220. Conversely, in the "on" position the second valve 202 permits fluid flow between the ports 220, 242 in both directions.

The fourth valve 206 may similarly be a 2/2 style valve. The fourth valve 206 may therefore include a port 244 coupled to the line 124 in fluidic communication with the piston-side 118 of the hydraulic cylinder 120, shown in FIG. 1. The fourth valve may further include a port 246 coupled to line 230. While in the "off" position, the fourth valve 206, via a one-way device, permits fluid flow from the port 246 to the port 244 and inhibits fluid flow in the opposite direction. Conversely, in the "on" position, the fourth valve 206 permits fluid flow between the ports 246, 244 in both directions.

The leveling manifold 104 may further include a first pressure compensator 248 (e.g., one-way valve) coupled to the LS component 110. The leveling manifold 104 may additionally include a second pressure compensator 250 coupled to line 252 via junction 254 and the line 226 via junction 256. The second pressure compensator 250 may be designed to manage supply pressure in relation to load sensing. To elaborate, the second pressure compensator may be designed to maintain a substantially constant pressure drop across the fourth valve and orifices to maintain a desire leveling speed independent from system load.

The leveling manifold 104 may further include the first and second relief valves 238, 240. However, in other embodiments, the first relief valve 238 may be omitted from the system. The first relief valve 238 may be arranged in a line 260. The line 260 extends between the line 122 and the line 214, thereby bypassing the first valve 200, the second valve 202, and a first orifice 261. The second relief valve 240 may be arranged in a line 262 which extends between the lines 124, 236. The line 262 therefore may bypass the fourth valve 206, the third valve 204, and a second orifice 264. The relief valves may discharge pressure in the piston and rod chamber of the hydraulic cylinder. To elaborate, the first relief valve 238 may open and allow fluid to flow through line 260 into line 214 when the pressure in the line 122 exceeds a threshold value. Conversely, the first relief valve 238 may close when the pressure in the line 122 drops below the threshold value. The second relief valve 240 may function in a similar manner and each relief valve may include components such as a housing, spring(s), chamber(s), and the like to achieve the aforementioned functionality.

The leveling manifold 104 may further include a plurality of orifices (e.g., a first, second, third, and fourth orifices 261, 264, 266, 268) designed to manage and set leveling function speed. To elaborate, the orifices may dictate the rate of suspension stiffness and position adjustment. Specifically, the orifices 261, 266 in fluidic communication with the first and second valves 200, 202 may manage the flow rate for stiffness adjustment. Additionally, the orifices 264, 268 in fluidic communication with the valves 204, 206, may manage the position adjustment speed. The orifice sizing may be tuned based on end-use targets. The orifices may therefore include a housing with an interior profiled for flow restriction.

Specifically, in one example, the first orifice 261 may be positioned in line 214, the second orifice 264 may be positioned in line 224, the third orifice 266 may be positioned in line 236, and the fourth orifice 268 may be arranged in line 226. However, in other examples, the orifice layout may be selected to reduce the chance (e.g., avoid) load sensing pressurization when pressure or position of the hydraulic cylinder is reduced, for example.

FIG. 6 depicts a leveling manifold 600 with an alternate orifice layout. The leveling manifold 600 includes components such as a first valve 602, a second valve 604, a third valve 606, a fourth valve 608, etc. similar to the components in the leveling manifold 104, depicted in FIG. 2. Thus, these components may have a similar function and structure and redundant description is therefore omitted for brevity. As illustrated, the leveling manifold 600 may include orifices 610 coupled to lines 612, 614 near the valves 604, 608. To elaborate, the orifices are shown arranged between junctions 615 with the branch lines 617 for the pressure relief valves 619 and the valves 604, 608 (e.g., the 2/2 valves). Check valves 616 may be coupled in parallel with the orifices 610, to reduce (e.g., avoid) the orifices' impact on the system during the rising phase of suspension adjustment. In this way, the leveling manifold may achieve targeted flow characteristics without unduly impacting the manifold's height adjustment functionality, if desired. Orifices 618 are arranged in lines 620, 622 coupled to the valves 602, 606, similar to the leveling manifold 104, shown in FIG. 2. The sizing of the orifices again may be selected to achieve targeted rates of suspension stiffness and position adjustment.

The leveling manifold 104 may further include a shuttle valve 270 coupled to lines 272, 274. The lines 272, 274 may be in fluidic communication with lines 218, 230, respectively. The shuttle valve 270 may allow the LS component 110 to see the higher pressure in one of the lines 218, 230. The leveling manifold 104 may further include a first pressure sensor 276 coupled to line 122 via junction 278. The leveling manifold 104 may further include a second pressure sensor 280 coupled to the line 124 via junction 282. The pressure sensors may be used to accurately determine and control the pressure of the fluid delivered to the hydraulic cylinder 120 in the stiffness adjustment mode.

A first flow path 284 in the leveling manifold 104 is shown extending on a first side 285 (e.g., rod-connecting side) of the manifold on the first end 208 to the second end 210 through the second valve 202 and the first valve 200. To elaborate, the first flow path 284 may include a section of the line 124 in the manifold, the second valve 202, the line 218, the first valve 200, and the line 214. A second flow path 286 in the leveling manifold 104 is shown extending on a second side 287 (e.g., piston-connecting side) of the manifold from the first end 208 to the second end 210 through the fourth valve 206 and the third valve 204. Specifically, the second flow path 286 may travel through a portion of the line 124 which is in the manifold, the fourth valve 206, the line 230, the third valve 204, and the line 226. Designing the manifold with these flow paths enables the system to independently manage suspension position and static stiffness to achieve desired suspension performance targets. To elaborate, the valves 200, 202, 204, 206 may be jointly controlled during a pressure adjustment mode to alter the hydraulic cylinder's stiffness while the position of the hydraulic cylinder remains substantially constant. Cooperative control of the valves may be further used to adjust the position (e.g., ride height) of the hydraulic cylinder while the cylinder's stiffness remains substantially constant. In this way, the system's performance characteristics may be granularly tailored to suit the vehicle's specific operating conditions, if so desired. Consequently, the system's kinematic adjustability may be expanded which increases the system's customer appeal.

Referring to FIG. 3, a method 300 for operating a suspension system is shown. The method 300 may be implemented via one or more of the vehicle, suspension systems, and system components described above with regard to FIGS. 1-2 and/or 6. However, in other examples, the method 300 may be implemented by other suitable vehicles, suspension systems, etc. Furthermore, in one embodiment, the method 300 may be stored as instructions in non-transitory memory executable by a processor of a controller, such as the controller 152 depicted in FIG. 1. However, additional or alternate types of suitable control circuitry may be used, in other embodiments.

At 302, the method includes determining operating conditions. The operating conditions may include vehicle speed, vehicle load, ambient temperature, hydraulic cylinder position, hydraulic cylinder stiffness (e.g., piston chamber line pressure and rod chamber line pressure), and the like. These conditions may ascertained from sensor signals and/or modeled.

At 304, the method determines whether or not to enter a pressure, position, or pressure and position control mode. The parameters used as entry conditions for the modes may include vehicle speed, vehicle load, vehicle load distribution, operator input, and the like. For instance, the pressure control mode may be initiated responsive to an increase or decrease in vehicle speed or when the vehicle speed surpasses a threshold value (e.g., 30 kilometers per hour (km/h), 40 km/h, 50 km/h, etc.). The position control mode may be initiated responsive to variations in vehicle load or when the vehicle load surpasses a threshold value. The threshold value for position control may be determined based on a variety of factors such as the vehicle's intended operating environment, end-use design targets, and the like. In other examples, the modes may be initiated in response to user interaction with an input device indicating a desired level of cylinder position and/or stiffness.

If entry into the aforementioned suspension system control modes is not desired (NO at 304), the method moves to 306 where the method includes maintaining the suspension system's current operation mode. For instance, the suspension system may sustain the current hydraulic cylinder stiffness and position (e.g., ride height).

If it is determined that entry condition(s) for the position control mode are satisfied, the method moves to 308. At 308, the method includes implementing the position control mode. It will be appreciated that the position control mode and the pressure control mode may be carried out at distinct and non-overlapping time intervals. Implementing the position control mode includes at 310, coordinating control of the first, second, third, and/or fourth valve(s) to independently alter suspension position. In this way, cylinder position may be adjusted while adjustment of the cylinder's stiffness is substantially inhibited. For instance, a first set of valves (e.g., the second and third valves) may be turned on (e.g., turned on and intermittently turned off) while a second set of valves (e.g., the first and fourth valves) may be turned off (e.g., turned off and remain off while position adjustment unfolds) to increase the suspension's position (e.g., ride height). To elaborate, the second and third valves may be turned on intermittently (e.g., turned on and off for selected periods) to achieve the cylinder position target while keeping stiffness at a near a desired level (e.g., substantially constant). Conversely, the first set of valves may be turned off (e.g., turned off and remain off) while the second set of valves may be turned on (e.g., turned on and intermittently turned off) to increase the suspension's position. To elaborate, the first and fourth valves may be turned on and briefly turned off at selected times to achieve a targeted suspension position while keeping the stiffness a desired level or within a desired range. However, other valve control techniques in the position control mode are possible. It will be appreciated that in the position control mode the valves may be turned on and off based on pressure from the cylinder position sensor 146, shown in FIG. 1. Additional facets of the system's mode control strategies are described in greater detail herein with regard to FIG. 4.

If it is determined that entry condition(s) for the pressure control mode are satisfied, the method proceeds to 312. At 312, the method includes implementing the pressure control mode. Implementing the pressure control mode includes, at 314, coordinating control of the first, second, third, and/or fourth valve(s) to independently alter suspension stiffness. In this way, cylinder stiffness may be adjusted while adjustment of the cylinder's position is substantially inhibited. For example, a first set of valves (e.g., the first and third valves) may be turned on (e.g., turned on and intermittently turned off) while a second set of valves (e.g., the second and fourth valves) may be turned off (e.g., turned off and remain off) to increase the suspension's stiffness. Conversely, in such an example, the first set of valves (e.g., the first and third valves) may be turned off (e.g., turned off and remain off) while a second set of valves (e.g., the second and fourth valves) may be turned on (e.g., turned on and intermittently turned off) to decrease the suspension's stiffness. Again, the second and fourth valves may be turned on and briefly turned off at selected times to achieve a targeted cylinder pressure while keeping the suspension's position at or near a desired value. It will be understood that in the pressure control mode, the valves may be turned on and off based on signals from the pressure sensors 276, 280 shown in FIG. 2.

If it is determined that entry condition(s) for the position and pressure control mode are satisfied, the method advances to 316. At 316, the method includes implementing the position and pressure control mode. Implementing the position and pressure control modes includes, at 318, coordinating control of the first, second, third, and/or fourth valve(s) to alter suspension stiffness and position at overlapping times. For example, a first set of valves may be turned on (e.g., turned on and intermittently turned off) while a second set of valves is turned off (e.g., sustained in an off position) to enable the hydraulic cylinder's stiffness to increase while the position decreases or vice versa. Further in one example, in the position and pressure control mode the valves may be operated to jointly increase or decrease hydraulic cylinder stiffness and position, FIG. 4 depicts an exemplary chart 400 which correlates the configurations of the valves to the suspension systems operating modes, in one embodiment. As described herein exemplary does not denote any sort of preference but rather indicates one of many possible facets of the systems and methods described herein. In the chart the first, second, third, and fourth valves correspond to the valves 200, 202, 204, 206, shown in FIG. 2. Each of the valves are indicated in either an "on" or "off" configuration. To elaborate, the valves are shown in either a pressure control "on" configuration or a position control "on" configuration. In either of these "on" configurations, the valves may not remain on for the entire mode control duration and therefore may be shut off intermittently during the specified control mode, to achieve desired position or stiffness targets. Conversely, the indication of the valves in an "off" state may indicate that the valve remains off for the substantial duration of the control mode. Although FIG. 4 depicts one embodiment of a valve control scheme, other valve control schemes aimed at achieving independent stiffness and position adjustment may be utilized, in other embodiments.

Continuing with FIG. 4, the rows representing different arrangements in the position control mode are indicated at 402, 404. Specifically, the row 402 indicates a first position control mode arrangement, where the hydraulic cylinder's position is increased while the cylinder's stiffness is substantially sustained at or near a desired level. In the first position control mode arrangement, the second and fourth valves may be turned on (e.g., turned on and intermittently turned off) to provide position and pressure control while the first and fourth valves may be turned off (e.g., turned off and remain off). To elaborate, in one use case scenario in the first position control mode arrangement, the third valve may initially be turned on to increase cylinder position, while the second valve is turned on in order to discharge pressure on the rod-side of the cylinder which will increase due to the extension of the cylinder. In such a scenario, if the pressure on the rod-side of the cylinder rises too quickly, the third valve may be switched off for a short duration (e.g., one second, two seconds, three seconds, etc.) to allow the rod-side pressure to return to a targeted value while the second valve is kept on. Vice versa, if the pressure on the rod-side of the cylinder falls below a desired valve, due to the relatively slow cylinder movement, the second valve may be switched off for a relatively short duration while the third valve is kept on to allow the pressure on the rod-side to increase by a desired amount. In this way, the valves in the on state may be turned on and intermittently turned off to achieve independent position control adjustment. It will be understood, that this type of fine tuned valve control may be applied to the other modes and mode arrangements described herein with regard to FIG. 4.

On the other hand, the row 404 indicates a second position control mode arrangement, where the system's position is decreased while the cylinder's stiffness is substantially sustained at or near a desired level. In this way, the suspension system may adjust the system's ride height separate from suspension stiffness adjustment. In the second position control mode arrangement, the first and fourth valves may be turned on (e.g., turned on and intermittently turned off) to provide position and pressure control while the second and third valves may be turned off (e.g., turned off and remain off).

The rows representing different arrangements in the position and pressure control mode are indicated at 406, 408, 410, 412. Specifically, the row 406 indicates a first position and pressure control mode arrangement, where the hydraulic cylinder's position and stiffness are increased. In the first position and pressure control mode arrangement, the first and third valves may be turned on (e.g., turned on and intermittently turned off) while the second and fourth valves may be turned off (e.g., turned off and remain off). Thus, in the first position and pressure control mode arrangement, the first valve may provide pressure control and the third valve may provide position control.

Row 408 indicates a second position and pressure control mode arrangement, where the cylinder's position and stiffness are decreased. In the second position and pressure control mode arrangement, the second and fourth valves may be turned on (e.g., turned on and intermittently turned off) to provide pressure and position control, respectively, while the first and third valves may be turned off (e.g., turned off and remain off). Row 410 indicates a third position and pressure control mode arrangement, where the cylinder's position is increased and the stiffness is decreased. In the third position and pressure control mode arrangement, the second and third valves may be turned on (e.g., turned on and intermittently turned off) to provide pressure and position control, respectively, and the first and fourth valves may be turned off (e.g., turned off and remain off). Row 412 indicates a fourth position and pressure control mode arrangement, where the cylinder's position is decreased and the stiffness is increased. In the fourth position and pressure control mode arrangement, the first and fourth valves may be turned on (e.g., turned on and intermittently turned off) to provide pressure and position control, respectively, while the second and third valves may be turned off (e.g., turned off and remain off).

The rows representing different arrangements in the pressure control mode are indicated at 414, 416. Specifically, the row 414 indicates a first pressure control mode arrangement, where the cylinder's stiffness is increased while the cylinder's position is substantially sustained at or near a desired level. In the first pressure control mode arrangement, the first and third valves may be turned on (e.g., turned off and remain off) to provide pressure control while the second and fourth valves may be turned off (e.g., turned off and remain off). On the other hand, the row 416 indicates a second pressure control mode arrangement, where the cylinder's stiffness is decreased while the cylinder's position is substantially sustained at or near a targeted level. In the second pressure control mode arrangement, the second and fourth valves may be turned on (e.g., turned on and intermittently turned off) to provide pressure control while the first and third valves may be turned off (e.g., turned off and persist in an off position). In this way, the suspension system may separately adjust the system's ride height and suspension stiffness.

In one exemplary control implementation, the suspension system may be further operated in a regenerative mode at rows 408, 416. Specifically, at row 408, the regenerative system may capture kinetic energy from the cylinder as its height is decreasing. At row 416, the energy corresponding to the decrease in cylinder stiffness may be captured via the regenerative system. Thus, in the regenerative mode, kinetic energy from the hydraulic cylinder may be recovered and stored for subsequent use via the suspension system and/or other vehicle systems. For instance, the cylinder's kinetic energy may be converted into electrical energy via a generator rotationally coupled to a hydraulic pump in the regenerative system. The regenerative system may then store the electrical energy via a battery and/or other suitable energy storage device for use by vehicle accessories. The vehicle's energy efficiency is increased when the regenerative mode of operation is deployed.

FIG. 5 shows a diagram 500 of a use-case operating strategy for a suspension system, such as the suspension system 102, shown in FIGS. 1-2 and/or 6. In particular, diagram 500 shows a series of plots 502, 504, 506, and 508, which indicate the operational states ("Activated" and "Deactivated") of the first, second, third, and fourth valves, respectively. Specifically, the operational states of the valves are indicated on the ordinates. These operational state correspond to the previously described "on" and "off" valve configurations. Vehicle speed is indicated on the ordinate of plot 510. In each plot, time is indicated on the abscissa, which increases from left to right. The vertical dashed line at t1 indicates a relative point of interest in time.

From t0 to t1, the vehicle speed is below a threshold value 512 (e.g., 40 km/h, 45 km/h, or 50 km/h). Additionally, from t0 to t1, the valves remain in deactivated states. When the valves are configured in this manner, the suspension system's leveling adjustment may be inactive.

At t1, vehicle speed surpassed the threshold value. Responsive this increase in speed, the method may enter the pressure control mode where the first valve and the third valve are activated and the second and the fourth valves remain deactivated (e.g., persist in off configurations) to increase suspension stiffness. To expound, the first valve may be turned on and intermittently turned off to fine tune pressure control adjustment while the cylinder's stiffness remains with a desired range. Additionally, in the illustrated use-case example, the third valve remains activated while the first valve is turned on and intermittently turned off to achieve a desired amount of stiffness adjustment while maintaining a substantially constant cylinder position. Conversely, in other examples, the third valve may be turned on and intermittently turned off while the first valve remains activated. In this way, the vehicle's handling performance may be increased. The increased handling performance may allow the vehicle to be operated at relatively higher speeds. For instance, in an agricultural use-case scenario, the vehicle may be used in both on and off road environments, thereby expanding vehicle capabilities.

The suspension systems and methods described herein have the technical effect of increasing the system's adaptability to enable gains in handling performance to be achieved by the vehicle, if wanted. These handling characteristics may increase customer appeal and expand the vehicle's applicability to a wide variety of end-use environments.

FIGS. 1-2 and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. As used herein, the term "substantially" is construed to mean plus or minus five percent of the range unless otherwise specified.

The invention will be further described in the following paragraphs. In one aspect a leveling manifold is provided that comprises a plurality of electrically-activated valves arranged between, on a first end, a rod-side and a piston-side of one or more hydraulic cylinders, and on a second end, a pump and a tank, wherein the plurality of electrically-activated valves include a first valve, a second valve, a third valve, and a fourth valve; a first flow path extending through the first and second valves and from the rod-side to the second end; and a second flow path extending through the third and fourth valves and from the piston-side to the second end; wherein the leveling manifold is designed to manage operation of the first, second, third, and/or fourth valves to independently adjust a position and a stiffness of the one or more hydraulic cylinders.

In another aspect, a method for operating a leveling manifold in a vehicle suspension system is provided that comprises in a position control mode, adjusting a level of one or more hydraulic cylinders, independent of adjusting a stiffness of the one or more hydraulic cylinders, via coordinated control of a first valve, a second valve, a third valve, and a fourth valve; and in a pressure control mode, adjusting a stiffness of the one or more hydraulic cylinders, independent of adjusting the position of the one or more hydraulic cylinders, via coordinated control of the first, second, third, and fourth valves; and wherein the first, second, third, and fourth valves are arranged between on a first end, a rod-side and a piston-side of one or more hydraulic cylinders, and on a second end, a pressure source and a tank. In one example, the method may further comprise, in a pressure and position control mode, adjusting the position and stiffness of the one or more hydraulic cylinders at an overlapping time.

In yet another aspect, a vehicle suspension leveling manifold is provided that comprises a plurality of electrically-activated valves arranged between, on a first end, a rod-side and a piston-side of one or more hydraulic cylinders, and on a second end, a pump and a tank, wherein the plurality of electrically-activated valves include a first valve, a second valve, a third valve, and a fourth valve; a first flow path extending through the first and second valves and from the rod-side to the second end; a second flow path extending through the third and fourth valves and from the piston-side to the second end; and a controller configured to: in a position control mode, adjust a position of the one or more hydraulic cylinders independent of adjusting a stiffness of the one or more hydraulic cylinders; and in a pressure control mode, adjust the stiffness of the one or more hydraulic cylinders independent of adjusting the position of the one or more hydraulic cylinders.

In any of the aspects or combinations of the aspects, the leveling manifold may further comprise a controller configured to: in a position control mode, adjust the position of the one or more hydraulic cylinders independent of adjusting a stiffness of the one or more hydraulic cylinders.

In any of the aspects or combinations of the aspects, in a first position control mode arrangement, the second valve and the third valve may be turned on and/or intermittently turned off; and the first and fourth valves may be turned off and persist in the off configuration to lengthen the one or more hydraulic cylinders while the stiffness of the one or more hydraulic cylinders is maintained in a targeted range.

In any of the aspects or combinations of the aspects, in a first state of the position control mode, the second valve and the third valve may be turned on to lengthen the one or more hydraulic cylinders; and in a second state of the position control mode, the first valve and the fourth valve may be turned on to shorten the one or more hydraulic cylinders.

In any of the aspects or combinations of the aspects, the leveling manifold may further comprise a controller configured to: in a pressure control mode, adjust the stiffness of the one or more hydraulic cylinders independent of adjusting a position of the one or more hydraulic cylinders.

In any of the aspects or combinations of the aspects, in the pressure control mode, the first valve and the third valve may be turned on and/or intermittently turned off; and the second and fourth valves may be turned off and persist in the off configuration to increase the stiffness of the one or more hydraulic cylinders while the position of the one or more hydraulic cylinders is maintained in a targeted range.

In any of the aspects or combinations of the aspects, in the pressure control mode, the first valve and the third valve may be turned on to increase the stiffness of the one or more hydraulic cylinders and the second valve and the fourth valve may be turned on to decrease the stiffness of the one or more hydraulic cylinders.

In any of the aspects or combinations of the aspects, the second valve and the third valve may be designed to adjust the position of the one or more hydraulic cylinders while maintaining the stiffness of the one or more hydraulic cylinders in a targeted range.

In any of the aspects or combinations of the aspects, the leveling manifold may further comprise a pressure compensator coupled to a load sensing line, coupled to the first valve and the third valve, and designed to maintain a desired leveling speed independent from a load.

In any of the aspects or combinations of the aspects, the leveling manifold may further comprise a plurality of orifices in fluidic communication with the first valve, the second valve, the third valve, and/or the fourth valve, wherein the plurality of orifices may be designed to set a speed of the position adjustment and/or manage a flow rate during stiffness adjustment.

In any of the aspects or combinations of the aspects, the leveling manifold may further includes a first relief valve coupled to the third valve and the fourth valve and designed to discharge pressure from a piston chamber; and a second relief valve coupled to the first valve and the second valve and designed to discharge pressure from a rod chamber.

In any of the aspects or combinations of the aspects, the first valve and the second valve may be designed to adjust the stiffness of the one or more hydraulic cylinders.

In any of the aspects or combinations of the aspects, the second valve and the third valve may be designed to adjust the position of the one or more hydraulic cylinders.

In any of the aspects or combinations of the aspects, the leveling manifold may further comprise a pressure compensator coupled to a load sensing line, coupled to the third valve, and designed to manage supply pressure in the leveling manifold.

In any of the aspects or combinations of the aspects, the leveling manifold may further comprise a plurality of orifices in fluidic communication with the first valve and/or the third valve and may be designed to set a speed of the position adjustment.

In any of the aspects or combinations of the aspects, the leveling manifold may further comprise a relief valve coupled to the third valve and the fourth valve and may be designed to discharge pressure from a piston chamber.

In any of the aspects or combinations of the aspects, adjusting the level of the one or more hydraulic cylinders may include turning the first, second, third, and/or fourth valves on or off based on position and pressure signals.

In any of the aspects or combinations of the aspects, adjusting the stiffness of the one or more hydraulic cylinders may include turning the first, second, third, and/or fourth valves on or off based on signals from: a first pressure sensor coupled to a first hydraulic line extending between a rod and the second valve; and a second pressure sensor coupled to a second hydraulic line extending between a piston and the fourth valve.

In any of the aspects or combinations of the aspects, adjusting the stiffness of the one or more hydraulic cylinders may occur while vehicle speed is greater than a threshold value.

In any of the aspects or combinations of the aspects, in the position control mode, the second valve and the third valve may be turned on and the first valve and the fourth valve may be turned off to lengthen the one or more hydraulic cylinders and the first valve and the fourth valve may be turned on and the second valve and the third valve may be turned off to shorten the one or more hydraulic cylinders.

In any of the aspects or combinations of the aspects, in the pressure control mode, the first valve and the third valve may be turned on and the second valve and the fourth valve may be turned off to increase the stiffness of the one or more hydraulic cylinders and the second valve and the fourth valve may be turned on and the first valve and the third valve may be turned off to decrease the stiffness of the one or more hydraulic cylinders.

In any of the aspects or combinations of the aspects, while operating in a first state of the position control mode, the second valve and the third valve may turned on and the first valve and the fourth valve may be turned off to lengthen the one or more hydraulic cylinders; and while operating in a second state of the position control mode, the first valve and the fourth valve may be turned on and the second valve and the third valve may be turned off to shorten the one or more hydraulic cylinders.

In any of the aspects or combinations of the aspects, in a first position control mode arrangement, the second valve and the third valve may be turned on and/or intermittently turned off and the first valve and the fourth valve may be turned off to lengthen the one or more hydraulic cylinders; and in a second position control mode arrangement, the first valve and the fourth valve may be turned on and/or intermittently turned off and the second valve and the third valve may be turned off to shorten the one or more hydraulic cylinders.

In any of the aspects or combinations of the aspects, in a first pressure control mode arrangement, the first valve and the third valve may be turned on and/or intermittently turned off and the second valve and the fourth valve may be turned off to increase the stiffness of the one or more hydraulic cylinders; and in a pressure control mode arrangement, the second valve and the fourth valve may be turned on and/or intermittently turned off and the first valve and the third valve may be turned off to decrease the stiffness of the one or more hydraulic cylinders.

In any of the aspects or combinations of the aspects, while operating in a first state of the pressure control mode, the first valve and the third valve may be turned on and the second valve and the fourth valve may be turned off to increase the stiffness of the one or more hydraulic cylinders; and while operating in a second state of the pressure control mode, the second valve and the fourth valve may be turned on and the first valve and the third valve may be turned off to decrease the stiffness of the one or more hydraulic cylinders.

In any of the aspects or combinations of the aspects, the controller may be configured to: in a pressure and position control mode, adjust the position and stiffness of the one or more hydraulic cylinders at an overlapping time.

In any of the aspects or combinations of the aspects, the controller may be configured to: while the stiffness of the one or more hydraulic cylinders is decreasing, operate a regenerative assembly to recover energy from a decrease in the stiffness of the one or more hydraulic cylinders.

In another representation, a modular hydraulic suspension package for a vehicle is provided that comprises a leveling hydraulic circuit in fluidic communication with a double acting hydraulic cylinder coupled to a vehicle axle and chassis, the leveling hydraulic circuit, in selected modes of operation, (i) independently adjust a stiffness of the hydraulic cylinder without adjusting a ride height of the double acting hydraulic cylinder and (ii) independently adjust the ride height of the hydraulic cylinder without adjusting the stiffness of the double acting hydraulic cylinder.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken to alter a state of a device. The specific routines described herein may represent one or more of any number of processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to suspension systems with different configurations and in a vehicle with a variety of propulsion sources such as motors, engines, combinations thereof, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A leveling manifold, comprising:
a plurality of electrically-activated valves arranged between, on a first end, a rod-side and a piston-side of one or more hydraulic cylinders, and on a second end, a pressure source and a tank, wherein the plurality of electrically-activated valves include a first valve, a second valve, a third valve, and a fourth valve;
a first flow path extending through the first and second valves and from the rod-side to the second end; and
a second flow path extending through the third and fourth valves and from the piston-side to the second end;
wherein the leveling manifold is designed to coordinate control of the first, second, third, and/or fourth valves to independently adjust a position and a stiffness of the one or more hydraulic cylinders;
wherein, in a first position control mode arrangement, the second valve and the third valve are turned on and/or intermittently turned off; and
wherein the first and fourth valves are turned off and persist in the off configuration to lengthen the one or more hydraulic cylinders while the stiffness of the one or more hydraulic cylinders is maintained in a targeted range.

2. The leveling manifold of claim 1, further comprising:
a controller configured to:
in a position control mode, adjust the position of the one or more hydraulic cylinders independent of adjusting the stiffness of the one or more hydraulic cylinders.

3. The leveling manifold of claim 1, further comprising:
a controller configured to:
in a pressure control mode, adjust the stiffness of the one or more hydraulic cylinders independent of adjustment of a position of the one or more hydraulic cylinders.

4. The leveling manifold of claim 3, wherein:
in the pressure control mode, the first valve and the third valve are turned on and/or intermittently turned off; and
the second and fourth valves are turned off and persist in the off configuration to increase the stiffness of the one or more hydraulic cylinders while the position of the one or more hydraulic cylinders is maintained in a targeted range.

5. The leveling manifold of claim 1, wherein the first valve and the second valve are designed to adjust the stiffness of the one or more hydraulic cylinders.

6. The leveling manifold of claim 1, wherein the second valve and the third valve are designed to adjust the position of the one or more hydraulic cylinders while maintaining the stiffness of the one or more hydraulic cylinders in a targeted range.

7. The leveling manifold of claim 1, further comprising a pressure compensator coupled to a load sensing line, coupled to the first valve and the third valve, and designed to maintain a desired leveling speed independent from a load.

8. The leveling manifold of claim 1, further comprising a plurality of orifices in fluidic communication with the first valve, the second valve, the third valve, and/or the fourth valve, wherein the plurality of orifices are designed to set a speed of the position adjustment and/or manage a flow rate during stiffness adjustment.

9. The leveling manifold of claim 1, further comprising:
a first relief valve coupled to the third valve and the fourth valve and designed to discharge pressure from a piston chamber; and
a second relief valve coupled to the first valve and the second valve and designed to discharge pressure from a rod chamber.

10. A method for operating a leveling manifold in a vehicle suspension system, comprising:
in a position control mode, adjusting a position of one or more hydraulic cylinders independent of adjusting a stiffness of the one or more hydraulic cylinders via coordinated control of a first valve, a second valve, a third valve, and a fourth valve;
in a pressure control mode, adjusting the stiffness of the one or more hydraulic cylinders independent of adjusting the position of the one or more hydraulic cylinders;
in a first pressure control mode arrangement, the first valve and the third valve are turned on and/or intermittently turned off and the second valve and the fourth valve are turned off to increase the stiffness of the one or more hydraulic cylinders; and
in a second pressure control mode arrangement, the second valve and the fourth valve are turned on and/or intermittently turned off and the first valve and the third valve are turned off to decrease the stiffness of the one or more hydraulic cylinders.

11. The method of claim 10, further comprising in a pressure and position control mode, adjusting the position and stiffness of the one or more hydraulic cylinders at an overlapping time.

12. The method of claim 10, wherein adjusting the position of the one or more hydraulic cylinders includes turning the first, second, third, and/or fourth valves on or off based on position and pressure signals.

13. The method of claim 10, wherein adjusting the stiffness of the one or more hydraulic cylinders includes turning the first, second, third, and/or fourth valves on or off based on signals from:

a first pressure sensor coupled to a first hydraulic line extending between a rod and the second valve; and
a second pressure sensor coupled to a second hydraulic line extending between a piston and the fourth valve.

14. The method of claim 10, wherein adjusting the stiffness of the one or more hydraulic cylinders occurs while vehicle speed is greater than a threshold value.

15. A vehicle suspension leveling manifold, comprising:
a plurality of electrically-activated valves arranged between, on a first end, a rod-side and a piston-side of one or more hydraulic cylinders, and on a second end, a pump and a tank, wherein the plurality of electrically-activated valves include a first valve, a second valve, a third valve, and a fourth valve;
a first flow path extending through the first and second valves and from the rod-side to the second end;
a second flow path extending through the third and fourth valves and from the piston-side to the second end; and
a controller configured to:
in a position control mode, adjust a position of the one or more hydraulic cylinders independent of adjusting a stiffness of the one or more hydraulic cylinders; and
in a pressure control mode, adjust the stiffness of the one or more hydraulic cylinders independent of adjusting the position of the one or more hydraulic cylinders;
wherein, in a first position control mode arrangement, the second valve and the third valve are turned on and/or intermittently turned off and the first valve and the fourth valve are turned off to lengthen the one or more hydraulic cylinders; and
wherein, in a second position control mode arrangement, the first valve and the fourth valve are turned on and/or intermittently turned off and the second valve and the third valve are turned off to shorten the one or more hydraulic cylinders.

16. The vehicle suspension leveling manifold of claim 15, wherein:
in a first pressure control mode arrangement, the first valve and the third valve are turned on and/or intermittently turned off and the second valve and the fourth valve are turned off to increase the stiffness of the one or more hydraulic cylinders; and
in a second pressure control mode arrangement, the second valve and the fourth valve are turned on and/or intermittently turned off and the first valve and the third valve are turned off to decrease the stiffness of the one or more hydraulic cylinders.

17. The vehicle suspension leveling manifold of claim 15, wherein the controller is configured to:
in a pressure and position control mode, adjust the position and the stiffness of the one or more hydraulic cylinders at an overlapping time.

18. The vehicle suspension leveling manifold of claim 15, wherein the controller is configured to:
while the stiffness of the one or more hydraulic cylinders is decreasing, operate a regenerative assembly to recover energy from a decrease in the stiffness of the one or more hydraulic cylinders.

* * * * *